Figure 1:
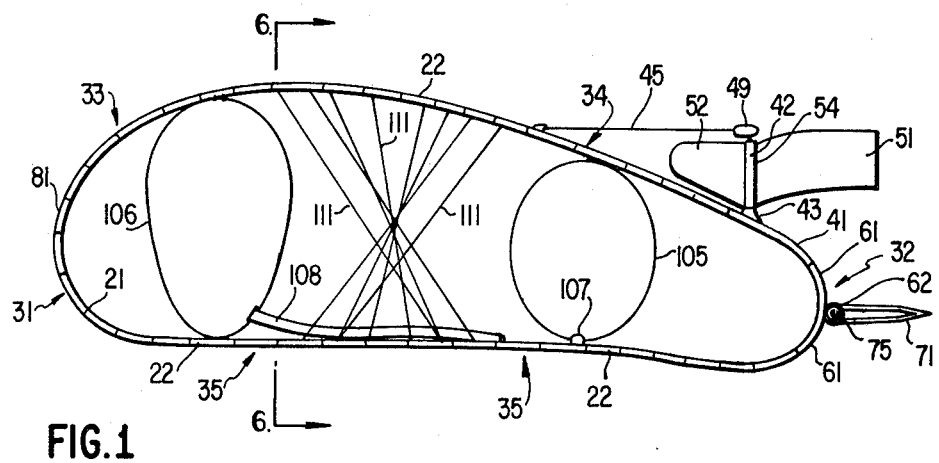

United States Patent [19]

Crompton

[11] 3,945,589
[45] Mar. 23, 1976

[54] AMPHIBIOUS DIRIGIBLE AIRSHIPS
[76] Inventor: George Crompton, 710 Armada Road S.,, Venice, Fla. 33595
[22] Filed: Aug. 21, 1974
[21] Appl. No.: 499,424

[52] U.S. Cl. .................... 244/30; 244/94; 244/125
[51] Int. Cl.² ......................................... B64B 1/02
[58] Field of Search ....... 244/30, 94, 125, 126, 131, 244/36

[56] References Cited
UNITED STATES PATENTS

| | | | |
|---|---|---|---|
| 1,753,068 | 4/1930 | Ross | 244/94 X |
| 1,762,845 | 6/1930 | Upson | 244/125 |
| 1,780,813 | 11/1930 | Burnelli | 244/36 |
| 1,855,695 | 4/1932 | Snyder | 244/36 X |
| 1,893,584 | 1/1933 | Fritsche | 244/94 X |
| 1,970,647 | 8/1934 | Deubel | 244/94 |
| 2,038,671 | 4/1936 | Olan | 244/30 |
| 2,945,653 | 7/1960 | Atkin | 244/131 X |
| 3,486,719 | 12/1969 | Fitzpatrick et al. | 244/125 X |

FOREIGN PATENTS OR APPLICATIONS

| | | | |
|---|---|---|---|
| 487,906 | 6/1938 | United Kingdom | 244/125 |
| 333,164 | 8/1930 | United Kingdom | 244/30 |

Primary Examiner—Trygve M. Blix
Assistant Examiner—Barry L. Kelmachter
Attorney, Agent, or Firm—George Crompton

[57] ABSTRACT

A lighter than air ship, with a bow plate on the bow, two cars suspended beneath the elongated bag, the cars having water ballast tanks, with scoops to take in water when the airship is landing on water and valves to let the water out when the airship is taking off, with a sea anchor and rode (rope) to the bow plate, a ground (bottom) anchor and rode (rope) to the bow plate, metal ribs attached to the bow plate and extending to a stern plate and connected to the bag both above and below the bag, with a vertical rudder for steering right and left, horizontal rudders for steering up and down and a ballonet inside the bag for keeping proper pressure, landing wheels for landing the airship on land, the cars being capable of landing the airship on water, the bag having an aerodynamic lifting shape so that the airship can take off and fly heavy and by dumping water can land safey and landing on water can take in water to be stable on the surface, can land on land with the wheels and be secured by the rodes.

16 Claims, 12 Drawing Figures

FIG. 3
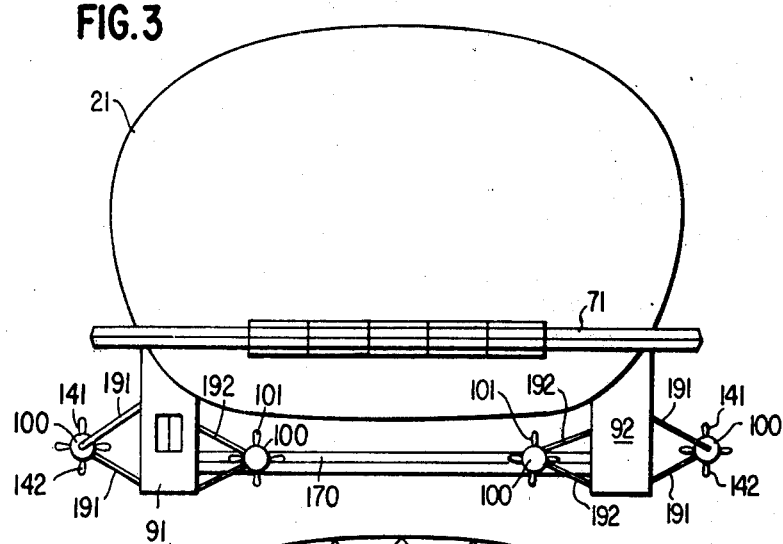
FIG. 4
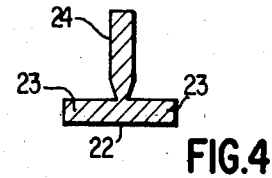
FIG. 5
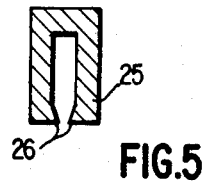
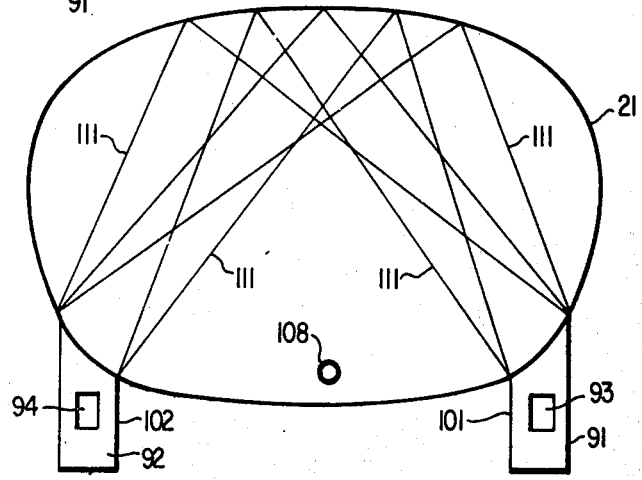
FIG. 6

AMPHIBIOUS DIRIGIBLE AIRSHIP

This invention relates to airships, lighter than air, that is, to aircraft which derive lift from a gas lighter than air, and it is an amphibious dirigible airship.

One object of the invention is to provide an airship which is amphibious, i.e., can land upon the land, e.g., a runway, and can land upon the sea including a bay or a large lake. Another object is to provide an airship which can take off heavy, which is not new, but which can take off heavier than usual, and which can land on the water, having pontoon-like floats to sustain it. Another object is to provide an airship which can come in light and, by taxiing along the surface of the water, can take in water to keep it down. Another object is to provide an airship which can taxi over the surface of the water and which, being heavy, can jettison the water and become light enough for takeoff.

Another object is to provide an airship which can be moored in a bay, for example, Great South Bay, N.Y., Barnegat Bay, N.J., Chesapeake Bay, Md., Pamlico Sound, N.C., by ground anchor, i.e., bottom anchor, and also at sea by sea anchor. Another object is to provide an airship and anchors, both ground anchor and sea anchor, whereby the officers and crew can readily release the airship from either one without assistance of ground or water crew and carry away the anchor or anchors with them. Another object of the invention is to provide an airship which can land on water, either a bay or the open sea, without assistance and which can readily be serviced by motor boats.

Another object is to provide a lighter than air craft having efficient aerodynamic properties for taking off and flying using aerodynamic lift to supplement the aerostatic lift. In World War II, the King airships took off as much as two thousands pounds heavy, but size for size this airship can take off heavier still. Another object is to provide an airship of the type indicated with control surfaces well above the bottom of the envelope to avoid any damage on takeoff or landing. Another object is to provide an airship capable of very high speeds when provided with sufficient power, that is, having a body which can withstand a very large aerodynamic drag. Another object is to provide simple controls for admitting water to the ballast tanks under the cars and equally simple controls for sealing the ballast tanks and for discharging the water therefrom. Another object is to provide an airship excellently designed for carrying armament such as rockets and with good controls so that the rockets can be fired, for example at a submarine, by maneuvering the airship so that they shoot dead ahead, thus simplifying operations and obviating any possibility that the reaction blast of the rockets shall injure the airship, especially the vital gas containing envelope which can contain hydrogen without risk of fire.

Another object is to provide the advantages of the semi-Astra-Torres construction and fore and aft ribs together with conventional ballonets for utmost strength and resistance to aerodynamic drag.

Other objects will be in part obvious or in part pointed out hereinafter.

In the accompanying drawings illustrating one version of the amphibious semi-rigid dirigible airship, L.T.A. of this invention.

Figure 2:
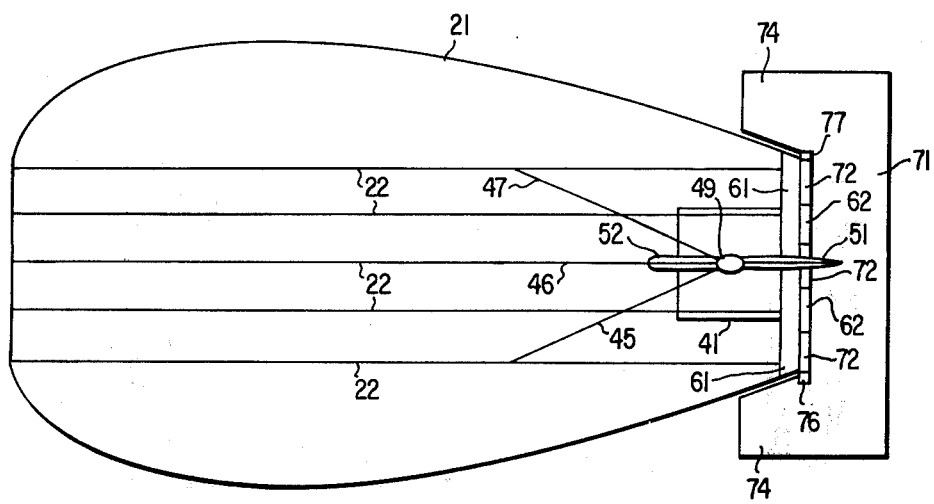
Figure 7:
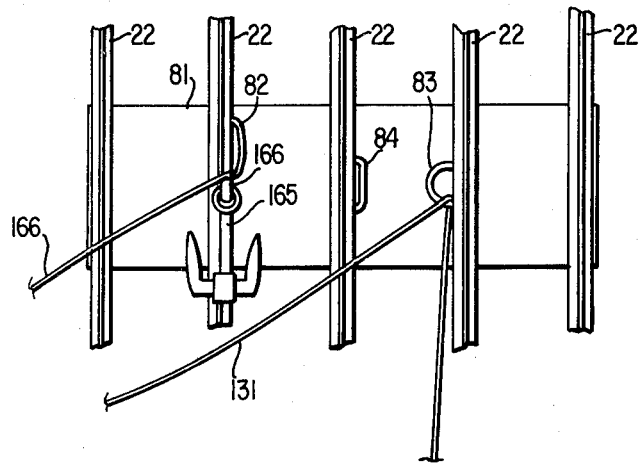
Figure 8:
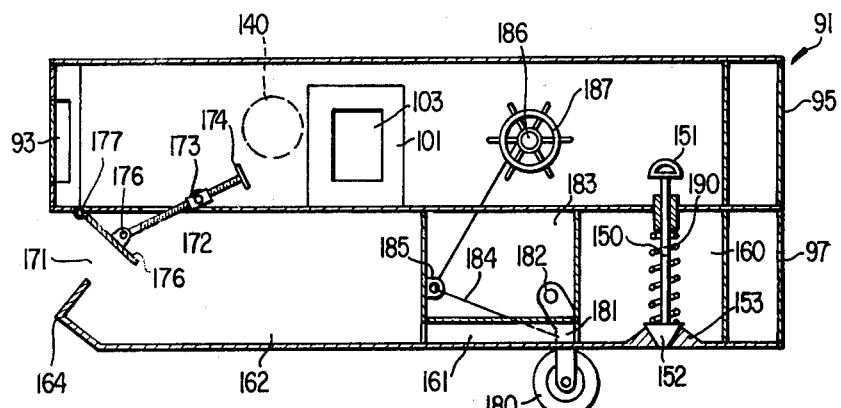
Figure 9:
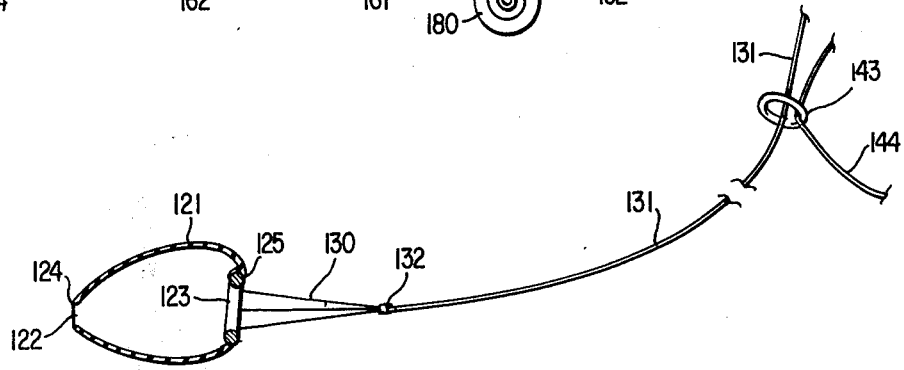
Figure 10:
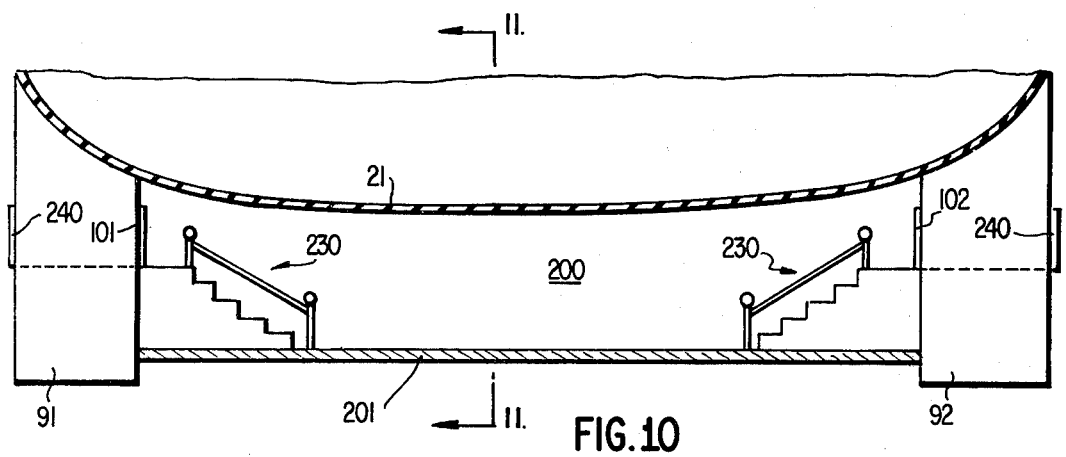
Figure 12:
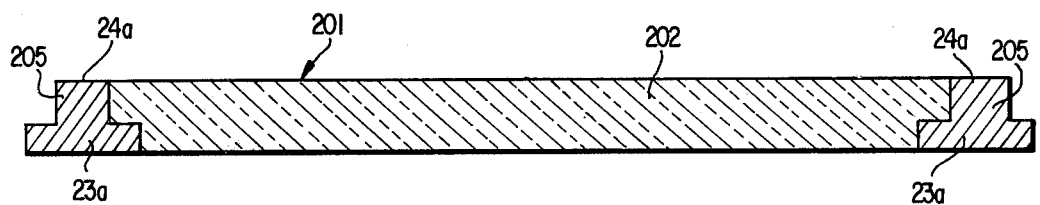
Figure 11:
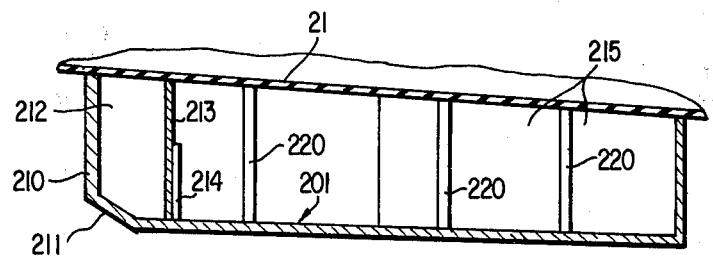

FIG. 1 is a longitudinal sectional view of the airship, being taken on the line 1—1 of FIG. 2, FIG. 2 is a plan view, FIG. 3 is an elevation of the airship from the stern (tail), FIG. 4 is a cross section of a rib, FIG. 5 is a cross section of a U-coupler to join together two ribs, FIG. 6 is a cross sectional view of the airship taken on the line 6—6 of FIG. 1, showing the forward ends (bows) of the cars in elevation, FIG. 7 is a front elevation of the nose (bow) plate on an enlarged scale, FIG. 8 is a longitudinal sectional view of a car on an enlarged scale, FIG. 9 is an isometric view of a useful sea anchor otherwise called a drogue, together with the rode and the retrieving line, FIG. 10 is a cross section of the lower part of the airship modified for cruising, transportation and pleasure, port is to the left, FIG. 11 is a cross section taken on the line 11—11 of FIG. 10, forward is to the left, FIG. 12 is a cross section of the floor of the airship of FIGS. 10 and 11.

Referring first to FIGS. 1, 2 and 6, the airship envelope 21 is typically a three-ply rubberized fabric, the plies being joined on the bias and cemented together, and Goodyear Aircraft, a division of Goodyear Tire and Rubber Company, Akron, Ohio, has made airship envelopes by the hundreds in this manner. Such fabric is cut into gores and then the gores are joined together in a manner well known to Goodyear. I envision this airship as having a capacity of 250,000 cubic feet which will give a gross lift at 70° F. and 30 inches of mercury sea level pressure of 17,500 pounds, using hydrogen. Helium can be used instead of hydrogen, and is safer, and gives a little less lift. Hydrogen was safe enough in World War I, and I am unaware of any hydrogen airship being lost by accidental fire alone, the Hindenburg was destroyed by sabotage.

This envelope 21 is reinforced with ribs 22, FIGS. 1, 2 and 4. The ribs 22 are of T-shape cross section, FIG. 4, and have heads 23 and webs 24. The webs 24 are of dove-tail shape and rib sections, for it would be inconvenient to make each rib 22 in one piece, are joined together by U-couplers 25, FIG. 5. The U-couplers 25 have internal dove-tails 26 whereby two rib sections 22 can be joined together with a coupler just by sliding the coupler over one rib web and sliding the next rib web into the coupler. Then by taper pins through preformed holes in two webs 24 and two couplers 25, two rib sections 22 are joined together.

This operation can be performed in the assembly of the airship. I recommend that the bag 21 be filled with a mixture of helium and air to put it in substantially static equilibrium, then the workmen can build up the ribs 22 section by section. It will be seen that the different sections will have different curvatures, some being nearly straight, others will sharply curve, for example, those near the bow. An adjustable pair of toggle pliers, available in many hardware stores, can be used to drive the taper pin through from one side of a coupler 25 through the web 24 through the other side of the coupler 25. These pliers are adjustable so that the distance between the jaws when the handles are in closed position can be varied and due to the toggle action they exert tremendous force, but they are hand tools easily managed. As aforesaid, the holes are preformed, and the holes in the couplers 25 on one side should be of slightly larger diameter than the matching holes on the other side.

The ribs 22 are secured in place on the outside of the envelope 21 by finger patches and cords going through holes in the heads 23, but as finger patches and cords are common in airship construction and well known to Goodyear, I have not illustrated same. I recommend as a material for the ribs 22 and the couplers 25 the metal titanium, which is widely used today in the manufacture of air frames (airplanes). It is strong and light in weight, corrosion resistant and malleable enough for present purposes. It can be drawn into the shapes shown. It used to be expensive but now by the Kroll process it is reasonable in price. It is far better than aluminum because aluminum checks and cracks, fractures, and this includes the alloy called duralumin, and airship disasters have been caused by the frangibility of aluminum and its alloys.

For the pins, not shown, I recommend bronze, and a good example is beryllium bronze, 99 Cu. 1Be, as bronze is swageable, thus making it possible to drive the pins through the ribs and the couplers to a vary tight fit. Furthermore there will be a slight electrolytic action between the titanium and the bronze thus bonding the pins to the couplers so that the final result is that each rib 22 is as if it were of one piece. In FIG. 2 I have shown five ribs 22 but there could be more and I don't recommend fewer.

The shape of my airship is shown in FIGS. 1, 2 and 3. As shown in FIG. 1, the nose 31 is blunt and resembles the leading edge of the early slow speed aircraft wings, in fact, the cross section of the airship, FIG. 1, is similar to an aircraft wing except that it is much thicker relatively. The tail 32 has a general resemblance to the tail of a K (King) type airship and has a general resemblance to the trailing edge of an airplane wing except that for structural reasons it is not sharp. The upper forward edge 33 deflects the air stream upwardly to cause reduced pressure over the after downwardly inclined portion 34 of the airship envelope which can be called a hull. The more or less flat bottom 35 has positive pressure on it when the axis of the airship is inclined upwardly. Thus the airship can take off with considerable aerodynamic lift, much more so than the more or less round in cross section airships such as the King airship, the L (Love) airship and World War I airships, that is with a given thrust.

As shown in FIGS. 1, 2 and 3, a rudder plate 41 which can be made of titanium extends across and is secured to the ribs 24 by the expedient of cords and holes in the webs and the plates. This rudder plate 41 supports a rudder post 42 made of hollow titanium which has a base 43 which is welded to the rudder plate 41. Bracing wires 45, 46 and 47 which can also be made of titanium hold the rudder post 42 against drag. Those wires 45, 46 and 47 extend through holes in and are welded into a streamlined welded-on top 49 of the rudder post 42. The other ends extend through holes in the webs 24 and then are twisted back on the wires and welded. Throughout this specification, "welded" means "soldered" wherever the context requires.

The rudder 51 has a counter balance 52 so that steering can be done by hand without a booster. It can be made of titanium sheets with titanium ribs, not shown, between the sheets, the sheets being welded to a titanium pipe 54 surrounding the rudder post 42. The usual horns, not shown, which can be welded to the titanium pipe 54 and themselves made of titanium provide the means for moving and holding the rudder 51; wires run from them to the steering wheels in the cars via guides and as this is well known airship construction, I am not showing the wires nor the guides and will not show the wheels for the vertical rudder 51 nor for the horizontal rudder which is an elevator about to be described.

Just aft of the rudder plate 41 is an elevator plate 61 which is curved as it fits the tail 32. It is desirably tied by cords through holes to the rudder plate 41 and is secured to the webs 24 of the ribs 22 by the same expedient. This elevator plate 61, which can also be called the stern plate, is likewise desirably made of titanium and has fixed hinges 62 welded to the stern plate 61.

The elevator 71 can be made out of titanium sheet with titanium braces between the sheets and they are welded to movable hinges 72 between the fixed hinges 62. The elevator 71 has counter balances 74 to make operation possible by manpower alone. Extending through the elevator 71 through the fixed hinges 62 and the movable hinges 72 is a pintle 75, which can be made of titanium tube, having an integral head 76 at one end and a screw-on cap 77 at the other end which can be pinned to prevent it from turning off. Horns, wires and guides provide means for operating the elevator by elevator wheels in the cars, and these are not shown because this construction is well known.

Referring now to FIG. 7, the bow plate 81 can also be made of titanium sheet. It has rib sections 22 welded to it and this gives it strength. It fits over the nose (bow) and is indicated in FIG. 1. It gives strength against the aerodynamic drag and has a ring 82 for one anchor, a ring 83 for the other anchor and a ring 84 for connection to the mooring mast. Let us say that the ring 82 is for the ground anchor and the ring 83 is for the sea anchor. These rings can also be made of titanium as I don't want to mix metals because that makes for trouble except in certain cases where you want electrolytic action.

Referring now to FIG. 6, the cars 91 and 92 are identical except that the one on the starboard side is mirrored with respect to the one on the port side. The one shown in FIG. 8 is the starboard side car. I prefer to make the cars of titanium throughout, except for windows, doors and the like and these should have titanium frames, and the transparent part is best made of methyl methacrylate. The front windows 93 and 94 are shown in FIG. 6, and these are desirably bowed for streamlining reasons, see also FIG. 8, and these windows do not open. Similarly for streamlining reasons, the cars 91 and 92 have sharp sterns, 95 (upper level), 97 (lower level). Connected to the cars 91 and 92 are engines 100. Access to and egress from the cars 91 and 92 is by way of doors 101 and 102 on the insides of the cars, these doors 101 and 102 having methyl methacrylate windows 103 and 104. By "the insides" I mean that the doors 101 and 102 face each other, that is, the door 101 of the car 91, which is the starboard car, is on the port side of the car 91 and the door 102 of the car 92, which is the starboard car, is on the port side of the car 92. However, this is merely a preference and the exact opposite could be adopted and in fact there could be two doors in each car. Numerous fixed methyl methacrylate windows which can be called ports can be set in the walls of the cars and these are not shown. For example, there could be such windows in the sterns 95 and 97 and methyl methacrylate transmits heat more slowly than any metal and, furthermore, it has low specific gravity and is quite strong.

In FIG. 1 I show the usual ballonets 105 and 106 to hold air to keep the airship inflated when descending, since the hydrogen or helium contracts when the airship descends. They are connected by large rubberized fabric pipes 107 and 108 to scoops (not shown) behind the propellers.

Referring now to FIGS. 1 and 6, the cars 91 and 92 are supported by cords 111 and I see no point in giving each cord a separate number since these figures show a suggested way of arranging the cords. These are nylon cords in the best mode known to me because I would hate the job of constructing the airship with metal wires inside. On the top these cords are secured to the fabric, in a manner known to Goodyear which represents the skill of the art. Just inside the ribs 22, at the bottom, they extend through glands in a manner also known to Goodyear to prevent the escape of gas.

After the envelope 21 is inflated with air and helium as aforesaid and the ribs 22 are secured in place, more helium should be pumped into the envelope 21 to give it more lift, and of course at that time it is prevented from rising by fabric bands about it to which are attached sandbags in the usual manner of airship erection. The nylon cords 111 are already in place having been arranged therein when the bag contained only air and was resting on the hangar floor so that the workmen could work inside. Every cord should be of surplus length inside so that it can be pulled down through the glands to make every cord taut and to divide the weight of the cars evenly among the many cords. A counting will show eight cords 111 in FIG. 1 which, multiplied by 10 shown in FIG. 6, makes 80 and this, of course, is only an illustrative example.

Now extra helium is added and this means a mixture of helium and air will be exhausted from bag 21 and either lost or reprocessed because it is possible to reprocess a mixture of air and helium and this is what was done at Lakehurst U.S. Naval Air Station in World War II. Finally, the bag has lift enough to lift both cars and then they are attached and sealed in a manner well known to Goodyear.

Referring now to FIG. 9, a sea anchor or drogue 121 is represented. This can be made of canvas (cotton duck will do, does not have to be watertight but can be rubberized.) It should have a hole 122 in the "bottom" to create a current of water when in use and a wide mouth 123 for entrance of the (sea) water. The hole 122 should be protected by a ring (bronze or brass will do) 124 and the mouth 123 should be held open by a ring 125, same metal or any other. To the ring 125 is connected a bridle 130 (say three nylon cords) that are connected to a rode 131 at 132. The rode 131 goes through the ring 83 and then through a porthole 140 (FIG. 8) and is belayed in the car. (The outside engines 100, FIG. 3, have propellor blades 141, 142.) There can be a ring 143 on the rode 131 connected to a line 144, which line goes directly through the porthole 140 and is belayed inside.

Advancing the airship by the engines until the sea anchor is approximately under the ring 83, any able bodied man can pull on the rode 131 and the water will flow out of the hole 122 until the sea anchor is empty. He can then pull on the line 144 (or another hand or officer can) to pull rode 131 and drogue 121 through the porthole 140.

In the meantime an officer pulls up the rod 150 (FIG. 8) by means of the handle 151 and this raises a conical valve 152 from a seat 153 to let the (sea) water out of a large chamber 160 connected by a large pipe 161 to a forward water chamber 162 which is filled by the landing and taxiing of the airship by the water going over the nose 164 of the car bottom. The water can be, of course, ordinary ocean salt water, Great Salt Lake water, brackish Great South Bay water, brackish "river" water of North Carolina, nearly pure water of Lake Erie, Lake Ontario, Lake Huron, Lake Michigan, Lake Superior, the Caspian Sea, etc. etc. Lots of it will be contaminated, as everyone knows, but if picked up from Lake Okeechobee in Florida, it is perfectly good to drink.

The sea anchor or drogue should hold about 90 pounds avoirdupois of water and when the axis is vertical, the water should run out in about 1 minute, so this will not strain any seaman 2C. In an airship at sea anchor, up elevator takes the airship down and down elevator lifts it. Perhaps Prof. Capt. J. C. Hunsaker, U.S.N. 08 retired, M.I.T., Cambridge, Mass. can explain this. He designed the 79,000 airships I flew in W.W.I.

The ground anchor, i.e., an anchor which reaches and clings to the bottom of the bay, river, pond, sea, harbor, etc., needs hardly be illustrated nor described. There is the fluke swivel type used on steamships, battleships, aircraft carriers, destroyers, etc., the old yachtsman's anchor with fixed flukes and a steel crossbar which could be folded to the shank for stowage on deck. I used to heave one of these weighing 90 lbs. from the deck of my yacht and the flukes were always forward. In this case i recommend a plow anchor or "Danforth" (trademark) and it can be pulled right up to the ring 82 by its rode. Rode is found in the unabridged Webster's dictionary and is local to U.S. and Newfoundland, but all U.S. Naval officers and yachtsmen understand it. It is usually Manila rope. As every Naval officer and yachtsman know, you move the ship forward with engines until the anchor is directly under the chocks on the bow and then haul on the rode and you can get it out of the worst mud (Cuttyhunk Harbor, Mass., for example, an excellent anchorage for my airship and right out to sea). FIG. 7 shows a ground anchor 165.

The ground anchor rode 166 goes through the porthole 140 and is cleated or belayed inside the cabin. It should be long, about 400 feet, as the nose of a 250,000 cu. ft. airshipp is high above the water.

I claim to have flown more airships to sea anchor than any man living or dead. I experimented with them in 1918 when I was Dirigible Officer at the above N.A.S. I experimented with them when I was Experimental Officer in 1942 and 1943 in the Atlantic from N.A.S., Lakehurst, N.J. They are very practical, but never never use a ballast bag with them.

FIG. 3 shows the engines (radial) 100 and the propellers 141 at the stern of the cars 91 and 92. To the rear of these are the conventional scoops (hollow cones) to collect the air blast from the propellers when they have r.p.m.'s half speed or better to send the air to ballonets 105 (rear) and 106 (forward) by rubberized fabric tubes 107 and 108. These are controlled in the cars by the dampers to let air into the ballonets, and by valves to let the air out.

Complete controls should be in each car. I like the controls of the King airships built by Goodyear (over 100 of them) for the U.S. Navy. On the starboard side of the car was the wheel (with longituding axis shaft)

for the vertical rudder, on the port side the wheel with a thwartship axis shaft for the elevator, and forward on the panel were the manometer tubes, central one for medium pressure, right and left for ballonet pressure, left forward, I believe, right aft, I believe, and there were the lanyards within easy reach of both officers to open and close each damper, to open and close each ballonet valve, and to open a helium valve to exhaust helium in emergency. It also opened automatically. I believe the lanyard for the helium valve was hardly ever used. There was also the ripcord probably never used.

In World War I, 1917 and 1918, the 79,000 cu. ft. dirigibles had similar controls, but the officer conning the ship had a rudder bar for the vertical rudder, and a hand wheel on his right for the elevator, the same lanyards and manometer tubes within his reach. The pressure on the three was similar, calibrated in inches of water (but the liquid was alcohol and red ink). One and one half inches was right, about 4 might burst the bag, one half was dangerously low, the bow might cave in and rupture the fabric, so my ribs 22 and my bow plate 81 offer great advantages. In World War I, I being Captain, ordered Gunner Meduskey (Warrant Officer) to pull the ripcord as we were in a dangerous place and the 79,000 cu. ft. Goodyear dirigible was filled with hydrogen. It was customary to pull the ripcord at the end of a free balloon flight to deflate the bag and then it and basket could be packed on a small truck. Meduskey and Chief Mate Nichols and I packed the 79,000 deflated dirigible on flat cars in 3 days and she flew again. I had flown her for about 15 hours continuously that day. There was no room for a second man in the pilot's seat.

All of this construction and control not special to my invention is known to Goodyear (subsidiary Goodyear Aero Space Corp. I believe) and to some of the L.T.A. Society, Masillon Road, Akron, Ohio, Pres. Dr. A. D. Topping, to many retired U.S. Naval Officers L.T.A., for example, to my friend Rear Admiral Scott E. Peck, U.S.N. retired, Naval Aviator 976 40 L St., Chula Vista Calif. 92011 (W.W.I. and W.W.II) and to Warner L. Hamlen (W.W.I.) 853 South Lucerne Blvd., Los Angeles, Calif. 90005, and Vice-Admiral Charles E. Rosendahl, Tom's River, Dover Township, Ocean County, N.J.

Therefore, I shall not elaborate upon these matters further for they represent the skill of the art. I note, however, that there were lanyards to pull the scoops up out of the slip stream.

I may provide a brace 170 between the cars, it should be made of hollow titanium and can carry wires for the intercoms between cars. But I may leave it off also as the intercoms can be T.B.S. radio or the wires can be attached to the inside or underside of the bag 21. It is desirable to be able to close the water scoop or port 171 so I provide a screw 172 passing through a swivel nut 173, the screw having a handle 174 and being pivoted at 175 to a plate 176 (titanium) pivoted at 177 to the car. I can do very well with one car so my invention is not restricted to two cars. The one car should be about amidships laterally.

For landing on the ground, the runway of an airport, large or small, or a golf course, etc., I provide a rubber tired wheel 180, FIG. 8, axled on an arm 181, pivoted 182 in a wheel well 83 either side of the tube 161, with a lanyard 184 going through a ring 185 to a shaft 186 of a hand wheel 187 which should have a ratchet wheel to be engaged by a liftable pawl, this being a common mechanical device so it is not illustrated. The airship should also have the common trailing handling lines but these are old and not shown.

Essentially, my airship is one which can be landed on water. Therefore, it can be anchored and serviced by small motor boats. The K airships of W.W.II generally had a landing crew of 40 men. Nor does it have to be semi-rigid as it has other advantages. In the U.S. Navy in W.W.I the airships were landed "on the ground" but they had no wheels. Mine can be easily landed "on the ground" without wheels.

My invention is not limited to a semi-rigid airship. With a car which can land on the sea, ocean, bay, river, etc., and take on water ballast and discharge same, fly to a sea anchor on the ocean and moor to a ground anchor in shallow water, it can be otherwise along the lines of the U.S. Navy K or the U.S. Navy M (Goodyear). See plate II Airship, Ency. Brit., Vol. 1, op. p 459.

As a fighting airship, I have now completed the description, except that I note I prefer a long coil spring 190 around the shaft or rod 150 as the hydraulic pressure can sometimes be from below. This airship is a fighting airship. Mount rockets on her, either several of the 5 inch variety of W.W.II and she can sink most any merchant ship or a destroyer. Mount an 11 inch rocket developed at the end of W.W.II on her and she can sink an aircraft carrier, a battleship or a cruiser. Mount a homing torpedo on her (I invented it in 1918 but it was not perfected for many years. On May 26, 1941 the giant German battleship Bismark was hit by a homing torpedo (which strikes the propellers and rudder) dropped by an aircraft of the Royal (British) Navy, and other torpedoes soon sank her.) My airship can carry a homing torpedo and sink any submarine and most warships.

Where to mount the rockets and the torpedo and how to aim them and fire them are secrets of the United States Navy and will not be dealt with herein. Consider a fleet of enemy ships and a dense fog on the sea up to 150 feet. The radar of my airship will locate the enemy ships, but the enemy ships cannot with their radar locate my airship. Their radar will pass right through the bag 21, the titanium will return but ripples and the cars 91 and 92 will return very little radar as my airship will be flown a mere 10 feet above the crests of the waves. (We flew a U.S. Navy K ship at 60 knots only 6 feet above the crests of the waves in W.W.II, I was the bombardier). Certainly underwater listening devices and sonar can be used by my airship but the details are secret. These will locate submarines and track them.

My airship is not limited to the use of reciprocating radial or other piston engines since jet engines can be used mounted on the outside brackets 191 or on the inside brackets 192. The efficient K airships (Goodyear) of W.W.II had a "displacement" of 425,000 cubic feet (of helium). They cruised at 50 knots. Build my airship of 750,000 cubic feet gas displacement, install two powerful jet engines and she can exceed 100 knots. The air scoop for the ballonets can be amidships, fore and aft, of the bag and at 70 knots or less it will provide the 3 inches water pressure of air wanted for the ballonets, less is regired. The dampers will control sending the air to the forward ballonet 106 (FIG. 1) or to the after ballonet 105 or both. The scoop should be close to the bag and the inlet probably rectangular, say 2 inches vertical and 12 inches long, cross section uniform and outlet controlled by the dampers to 108 and 107, FIG. 1. No lanyard to raise and lower the dampers need be provided and the drag will be minimal. Lanyards can operate the dampers from the car or cars.

In specifying titanium in this specification, I mean strong titanium and, as is usually the case, alloys are stronger. Page 251 of the Encyclopaedia Britannica, Vol. 22, copyright 1963, see table lower right, gives Beta (heat treated) 11% chromium, 3% aluminum, remainder titanium, Ti, as having a tensile strength of 200,000 pounds per square inch, p.s.i. In the best mode of the invention I now know, this is the Ti alloy to be used.

On page 1555 of the 44th edition of the Handbook of Chemistry and Physics, the tensile strength of Methyl Methacrylate (MM hereinafter, Trademarks Lucite Plexiglas) is given as 6,000–10,000 p.s.i. I know that MM can be copolymerized with other organic compounds, because in the 1930's, as a patent lawyer, I wrote 50 or more of such copolymers into ultimately issued patents for Samuel S. Kistler, Ph.D. and Carl E. Barnes, Ph.D., severally and maybe jointly. I do not have a better mode than MM and 10,000 p.s.i. seems adequate.

When MM is to be joined to Ti as in FIGS. 10, 11, and 12, I recommend a cement and the same Handbook of Chemistry and Physics gives a long list on p. p. 3433–3436. A-6, Armstrong Products Co., Warsaw, Ind. seems good to me, epoxy resin with activator. It is said to bond aluminum, so it will bond Ti and since it is a resin, it will bond MM. It is my best mode (choice) now.

For transportation and just pleasure, I modify the airship as shown in FIGS. 10, 11 and 12. There is a passenger compartment 200, located between and fastened to the cars 91 and 92. The floor 201 is made of MM plates 202 supported by Ti girders 205 having heads 23a and webs 24a, see FIG. 12. I envision the surface of the plates 202 to be 1 foot square and the plates 202 to be 1 foot square and the plates to be 1 inch thick, the rest in proportion as shown in FIG. 12. MM is highly transparent and the passengers will have good views of the sea, ship, yachts, cities, towns, hills, forests, woods. The forward end 210 is rounded to be streamlined and needs no Ti girders. The step 211 is for take-off and landing on water and can have Ti girders. This makes a sub-compartment 212 for officers' quarters, haing a bulkhead 213 and a door 214. Enlisted men can sleep in the cars 91 and 92 in bunks; officers have bunks with legs of different lengths. The superior quarters for passengers are in sub-compartment 215, FIG. 11, since they can see down and some of them to port or starboard. Where the Ti webs 24 are found, Ti posts 200 can be provided to connect them to webs 24a.

Titanium can be welded. See Ency. Brit. same article on Ti. Bars 24a should be welded end to end to extend the entire width of the compartment 201. Then short bars 24a a foot long apiece (and mortised to fit) should be welded to the long bars to make the spaces 1 foot square for the MM plates 202. The MM plates are also mortised as shown.

I have shown companionways 230 at each side of the compartment 200 leading to and from the doors 101 and 102. I don't see why I have to describe companionways, these can be built of attractive cedar wood, with newel posts and balustrades and Jaquard woolen carpets on the stairs and landings. Doors 240 should be provided at the outsides of the cars 91 and 92 in the cruising passenger airships to let the officers, crew and passengers in and out. The compartment 215 should be tapered aft to nearly a vertical line to reduce aerodynamic and hydraulic drag.

This airship (Naval or civilian) may be light after a long flight. It should be heavy with excess fuel on take-off and it can be flown heavy off the water because of the aerodynamic lift. If light when about to land, land in the ocean first, heading hard down and the tanks 160 and 162 will quickly fill with water. Then balance the airship to neutral (if possible), and neither heavy forward or aft by use of the ballonets 105 and 106. That is, the pilot can discharge air from one ballonet while filling the other ballonet (if he has r.p.m. of the propellers high enough or sufficient speed of the airship by jet engines.) Then fly to the bay, or river, or other shallow quiet water and landing is easy and the airship can be anchored by the ground anchor.

It will thus be seen that there has been provided by this invention a semi-rigid airship, an airship in which the various objects hereinabove set forth, together with many thoroughly practical advantages are successfully achieved. As many possible embodiments can be made of the invention and as many changes can be made in the embodiments described herein, it is to be understood that all matter hereinbefore set forth or shown in the accompanying drawings is to be interpreted as illustrative and not in a limiting sense.

When, in the claims, I recite "in which the airship envelope has a flat to slightly concave bottom in vertical section to enhance the aerodynamic lift of the airship," "slightly concave" means like the underside of a propeller driven airplane from the Wright Brothers through Glen H. Curtiss' various planes, the "Jennys", the R6 and N9 seaplanes, the NC flying boats, and later planes, including the propeller driven transports, but excluding turbo-jets and the true jet. The jet airplane was invented in or before 1910 by Henri Coanda of France and in 1910 was built by and flown by him over the Paris wall, but not being a good enough pilot, he crashed it on the other side and did not have money enough to build another one.

I claim:

1. A semi-rigid dirigible airship comprising an envelope for containing lifting gas (lighter-than-air), said envelope having a bow which is curved in vertical section for reduction of drag, having a metal bow plate on the bow, the stern of the airship being curved in vertical section for strength but on a shorter radius than that of the bow, a metal stern plate on said stern, an elevator pivotally connected to said stern metal plate, the axis of pivotal connection being substantially horizontal, a plurality of metal ribs attached to the bow plate and connected to the stern plate and extending fore and aft both on the top and on the bottom of the airship and secured to the envelope all along their lengths on top and bottom, said airship having a vertical rudder for steering starboard and port, propulsion means for said airship, at least one ballonet in said envelope to take in and exhaust air to keep the pressure up and not too great, a pair of separate cars one on either side of the airship underneath, cords inside said envelope extending from and attached to the upper part of the airship and attached to the cars for the support thereof, the cars being floatable for landing the airship on water, at least one car having a water ballast compartment, a scoop at the forward end of such car to take in water to the ballast compartment, and a valve to discharge the water.

2. A semi-rigid dirigible airship according to claim 1, in which the vertical rudder is on top of the airship mounted on a rudder post which is mounted on a metal plate which is secured to the airship.

3. A semi-rigid dirigible airship according to claim 2, in which the vertical rudder and the elevator have counter balances.

4. A semi-rigid dirigible airship according to claim 3, in which the ribs are made of titanium alloy.

5. A semi-rigid dirigible airship according to claim 4, in which the airship has a flat to slightly concave bottom in vertical section to enhance the aerodynamic lift of the airship.

6. A semi-rigid dirigible airship according to claim 1 in which both the vertical rudder and the elevator have counter-balances.

7. A semi-rigid dirigible airship according to claim 6, in which the ribs are made of titanium alloy.

8. A semi-rigid dirigible airship according to claim 7, in which the airship bottom has a flat to slightly concave bottom in vertical section to enhance the aerodynamic lift of the airship.

9. A semi-rigid dirigible airship according to claim 1 in which both the vertical rudder and the elevator have counter balances and in which the airship envelope has a flat to slightly concave bottom in vertical section to enhance the aerodynamic lift of the airship.

10. A semi-rigid dirigible airship according to claim 1, in which the airship has a flat to slightly concave bottom in vertical section to enhance the aerodynamic lift of the airship.

11. A semi-rigid dirigible airship according to claim 10, in which the vertical rudder is on top of the airship mounted on a rudder post which is mounted on a metal plate which is secured to the airship.

12. A semi-rigid dirigible airship according to claim 11, in which both the vertical rudder and the elevator have counter balances.

13. A semi-rigid dirigible airship according to claim 1, in which the airship envelope has a flat to slightly concave bottom in vertical section to enhance the aerodynamic lift of the airship and in which the ribs are made of titanium alloy.

14. A semi-rigid dirigible airship according to claim 13, in which the vertical rudder is on top of the airship mounted on a rudder post which is mounted on a metal plate which is secured to the airship.

15. An amphibious dirigible airship comprising an elongated bag containing gas lighter than air, said bag having a bow, rudders to direct said airship to starboard, to port, up and down, an air ballonet in said bag to keep said bag inflated and to prevent the pressure from rising too high despite changes in altitude of the airship, a bow plate on and secured to said bow, a sea anchor for said airship, a rode for and attached to said sea anchor, a ground anchor for said airship to be held to the bottom of a body of water, a rode for and attached to the ground anchor, a ring having an orifice for passage of the sea anchor rode therethrough, said ring being mounted to the bow plate, a ring having an orifice for passage of the ground anchor rode therethrough, said ring being mounted to the bow plate, a car secured to the bag and below it, means to belay said rodes so that they will not run through the rings, a water chamber in the bottom of said car, a water scoop near the bottom of the car to collect water for the water chamber when the car is on the surface of a body of water, a valve in the bottom of the chamber to let the water out and to keep it in, means in the car to operate the valve, a wheel well in the bottom of said car, a wheel for landing the moving airship on a runway, and apparatus for raising the wheel into the wheel well and for lowering it for landing.

16. An amphibious dirigible airship according to claim 15 having two cars each car having a landing wheel.

* * * * *